（12）United States Patent
Chavez

(10) Patent No.: US 7,548,007 B2
(45) Date of Patent: Jun. 16, 2009

(54) ROTOR SHAFT COUPLING

(75) Inventor: Munir Fallad Chavez, Baja California Norte (MX)

(73) Assignee: Comair Rotron Inc., San Diego, CA (US)

( * ) Notice: Subject to any disclaimer, the term of this patent is extended or adjusted under 35 U.S.C. 154(b) by 0 days.

(21) Appl. No.: 10/867,176

(22) Filed: Jun. 14, 2004

(65) Prior Publication Data

US 2005/0275307 A1    Dec. 15, 2005

(51) Int. Cl.
*H02K 1/22* (2006.01)
(52) U.S. Cl. .................... 310/265; 310/261; 310/91
(58) Field of Classification Search ................ 310/265, 310/261
See application file for complete search history.

(56) References Cited

U.S. PATENT DOCUMENTS 3,482,125 A * 12/1969 Fleckenstein ................ 310/42
3,513,339 A *  5/1970 Harris et al. .................. 310/90
3,875,462 A *  4/1975 Kiefer et al. .................. 241/36
4,494,028 A     1/1985 Brown .......................... 310/156
4,564,335 A *  1/1986 Harmsen et al. ........ 415/218.1
4,594,525 A *  6/1986 Stokes .................... 310/156.13
4,623,812 A * 11/1986 van de Griend ............. 310/268
4,647,803 A *  3/1987 von der Heide et al. ...... 310/51
5,955,812 A *  9/1999 Warner ......................... 310/233
6,170,275 B1 *  1/2001 Ueno et al. .................... 62/186
6,196,802 B1 *  3/2001 Matsumoto ............. 416/229 R
6,420,805 B1 *  7/2002 Yamaguchi et al. ....... 310/67 R
6,707,224 B1 *  3/2004 Petersen ....................... 310/254
6,841,112 B1     1/2005 Brown et al. ............ 264/272.19
2004/0212262 A1 * 10/2004 Chiu et al. ..................... 310/91

* cited by examiner

*Primary Examiner*—Nguyen N Hanh
(74) *Attorney, Agent, or Firm*—Dobrusin & Thennisch PC

(57) ABSTRACT

A rotor has a rim that diverges from its peripheral portion. Accordingly, the rim more securely couples with a shaft. More specifically, the rotor has a support member with a peripheral portion and an interior rim. The interior rim defines a central opening and, as noted above, diverges from the peripheral portion. The rotor also has a shaft coupled within the central opening of the support member.

27 Claims, 6 Drawing Sheets

ROTOR SHAFT COUPLING

FIELD OF THE INVENTION

The invention generally relates to motors and, more particularly, the invention relates to rotors and their shaft connections.

BACKGROUND OF THE INVENTION

Electric motors (e.g., AC or DC electric motors) are used in a wide variety applications, such as in fans to rotate a propeller blade, and in disk drives to rotate magnetic disks. To these and other ends, electric motors have two primary portions; namely, a stationary portion ("stator") that produces a varying magnetic field, and a rotational portion ("rotor") that rotates in response to the magnetic field produced by the stator. The rotor typically is fixedly secured to one end of a shaft, while the stator is rotatably secured to the other end of the shaft. The rotor and shaft thus rotate as a single unit (effectively acting as a single rotor) at a speed controlled by the magnetic field produced by the stator.

During operation, torsional and rotational stresses can be applied to the point where the shaft couples with the rotor. To ensure proper operation of the motor, it therefore is important to ensure that this coupling point can withstand anticipated operating stresses. Many currently available motors nevertheless secure the shaft to the rotor with a moldable material (e.g., zinc) that is less rigid than the materials making up the rotor and the shaft. Because of this relative softness, the moldable material often does not provide a sufficient coupling. Consequently, the shaft may uncouple from the rotor, causing the motor to fail. When the motor is a part of a cooling fan, for example, this failure can cause catastrophic failure of an underlying device it is cooling (e.g., a server or other computer device).

SUMMARY OF THE INVENTION

In accordance with one aspect of the invention, a rotor has a rim that diverges from its peripheral portion. Accordingly, the rim more securely couples with a shaft. More specifically, the rotor has a support member with a peripheral portion and an interior rim. The interior rim defines a central opening and, as noted above, diverges from the peripheral portion. The rotor also has a shaft coupled within the central opening of the support member.

In illustrative embodiments, the interior rim defines a plurality of protruding members that each diverge from the peripheral portion relative to the horizontal (of the rotor). The plurality of protruding members may include a first protruding member and a second protruding member. The first protruding member illustratively diverges in a direction above the horizontal, while the second protruding member diverges in a direction below the horizontal. Moreover, among other ways, the interior rim may diverge in a substantially planar manner from the peripheral portion. The rotor also may include material coupling the shaft with the support member. The material fills the central opening and is formed over at least a portion of the interior rim.

The rotor can be used for a variety of applications. For example, it may be used as a blower or fan. To that end, the rotor includes one of an impeller or propeller about the support structure. In illustrative embodiments, the shaft has an outer diameter that is smaller than the central opening of the support member.

The shaft may be substantially coaxial with the support member. For example, the support member has a substantial center of gravity, and the shaft is secured to the support member at its substantial center of gravity. In some embodiments, the interior rim includes a first portion and a second portion. The first portion is spaced from the second portion along a direction that is substantially parallel to the shaft. In yet other embodiments, the support member is cup-shaped.

In accordance with another aspect of the invention, a rotor includes a shaft coupled to a support member. To those ends, the support member has a peripheral portion and an interior rim defining a central opening that receives the shaft. The interior rim has first and second portions. The first portion of the interior rim is spaced in a first direction from the peripheral portion, while the second portion of the interior rim is spaced in a second direction from the peripheral portion. Both the first and second directions are substantially parallel to the shaft and different.

In accordance with other aspects of the invention, a motor has a stator, a shaft, and a rotor with a support member. The support member has a peripheral portion and an interior rim that defines a central opening. The interior rim diverges from the peripheral portion and has a first portion and a second portion. The first portion is spaced from the second portion in a direction substantially parallel with the shaft. To secure the rotor and the stator, the shaft is fixedly coupled within the central opening of the support member and rotatably coupled with the stator.

Some embodiments include rotor commutation circuitry to control rotation of the rotor.

In accordance with yet another aspect of the invention, a rotor has a support member with a peripheral portion and an interior rim. The interior rim defines a central opening that receives a shaft. The rotor also has a plurality of diverging members extending from the support member, and the prior noted shaft coupled within the central opening of the support member. The diverging members extend toward the shaft.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments, a rotor of an electric motor has a cup with a plurality of diverging, centrally extending protruding members (e.g., tabs). During production, the tabs are substantially encapsulated by a fill material to couple a shaft to the cup. The tabs thus effectively add strength to the fill material, consequently reducing the likelihood of the shaft uncoupling from the cup. Details of illustrative embodiments are discussed below.

Figure 1:
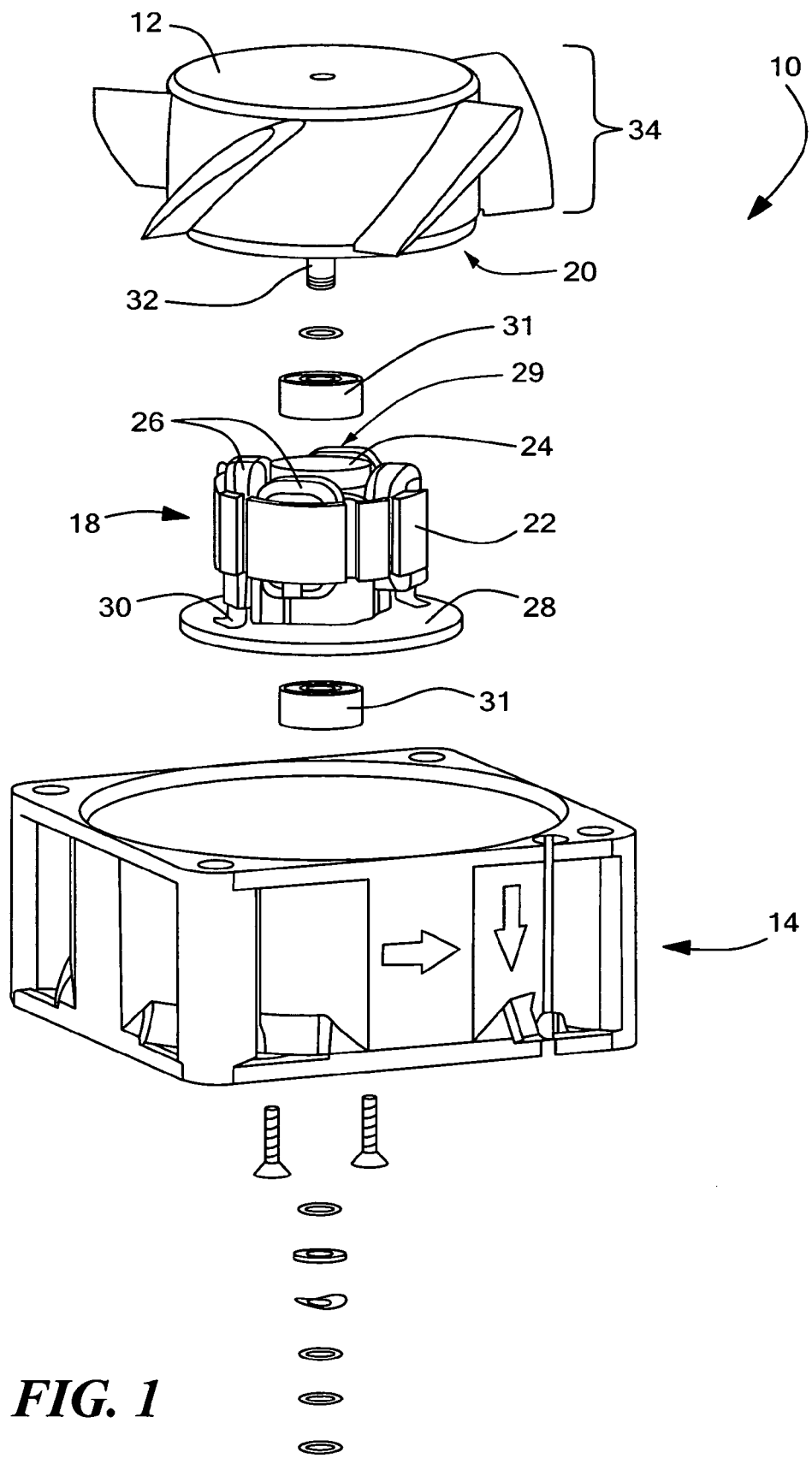
FIG. 1 schematically shows an exploded view of a motor using a rotor produced in accordance with illustrative embodiments of the invention.

FIG. 1 schematically shows an exploded view of a DC motor (referred to herein as "motor 10") having a rotor 20 produced in accordance with illustrative embodiments of the invention. The rotor 20 illustratively includes a propeller 12 and thus, is a part of a cooling fan. To that end, the motor 10 includes a housing 14 with venturi (not shown), a stator portion 18 secured to the housing 14, and the rotor 20 (which includes the propeller 12 and is shown in greater detail with reference to FIGS. 2 and 3A-3C). It should be noted that although the motor 10 is implemented as a fan, illustrative embodiments apply to other motor applications. Accordingly, description of the motor 10 as a fan is by illustration only and not intended to limit various embodiments of the invention. In a similar manner, although the discussed motor 10 is a brushless DC motor, principles of the invention apply to other types of motors, such as AC motors.

It should be noted that although a propeller 12 is shown, embodiments of the invention apply to other elements that perform a similar air flow function.

For example, an impeller may be used and thus, is considered equivalent to the propeller 12.

The stator 18 includes an insulated stator core 22, coils 26 wrapped about the stator core 22, and a circuit board 28 having electronics for controlling the energization of the coils 26. In illustrative embodiments, the stator core 22 is insulated by a molded insulation layer having an arbor 29 extending through a central tubular opening of the stator core 22. Bearings 31 secured within the arbor 29 receive a rotor shaft 32.

The circuit board 28 may be a printed circuit board having electronics for producing a magnetic field (via the coils 26) based upon the rotational position of the rotor 20. For example, for purposes of commutation, the circuit board 28 includes a magnetic sensor 30 (e.g., a Hall effect sensor), switching circuitry (not shown), and other related circuitry for controlling the flow of current to the coils 26. For additional details relating to circuit elements that may be included on the circuit board 28, see, for example, U.S. Pat. No. 4,494,028, the disclosure of which is incorporated herein, in its entirety, by reference.

Figure 2:
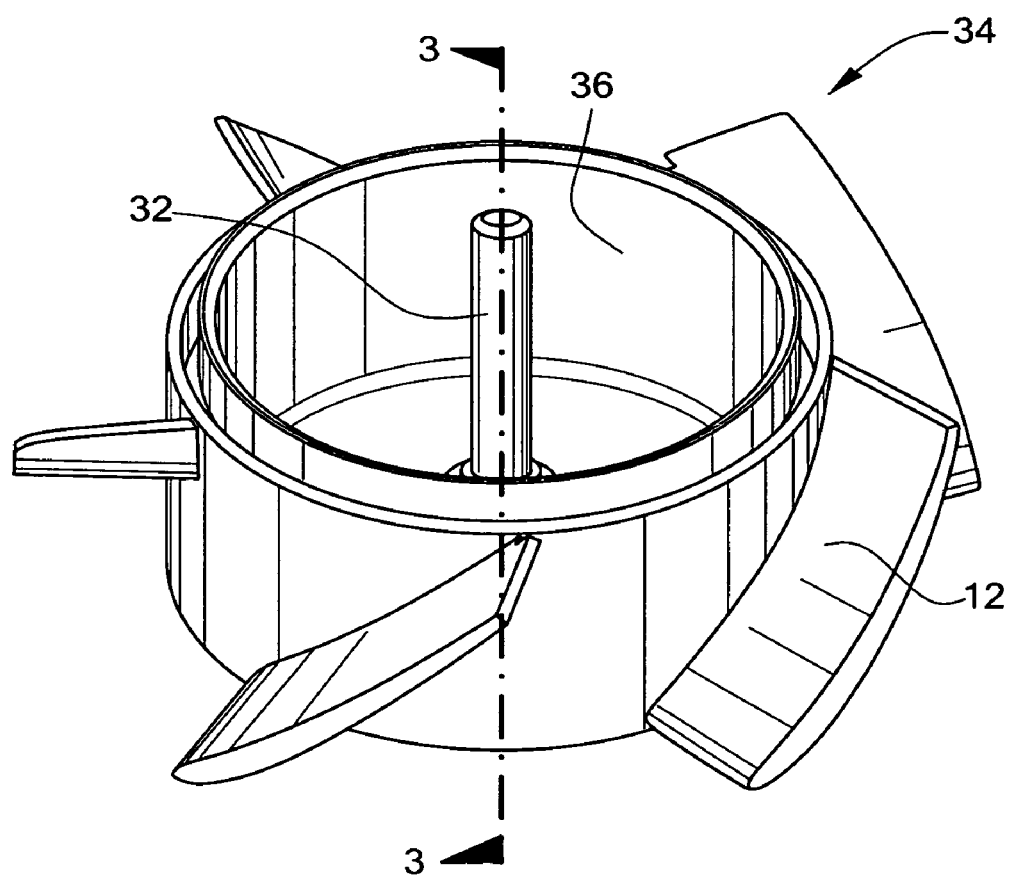
FIG. 2 shows a perspective view of a rotor assembly produced in accordance with illustrative embodiments of the invention.

FIG. 2 shows a perspective view of a rotor assembly 34 produced in accordance with illustrative embodiments. In particular, the rotor assembly 34 includes the propeller 12, a support member for the propeller 12 (e.g., a steel cup 36), and a metal shaft 32 extending from both the center of the steel cup 36 and the propeller 12. The rotor assembly 34 thus may be considered to effectively act as a rotor.

When assembled, the shaft 32 is received by the bearings 31 secured within the arbor 29. Details of one illustrative method of assembling the motor 10 are discussed below with reference to FIG. 4. An annular permanent magnet 39 (FIGS. 3A-3C) circumscribing the interior of the steel cup 36 illustratively interacts with the above described poles.

Figure 3A:
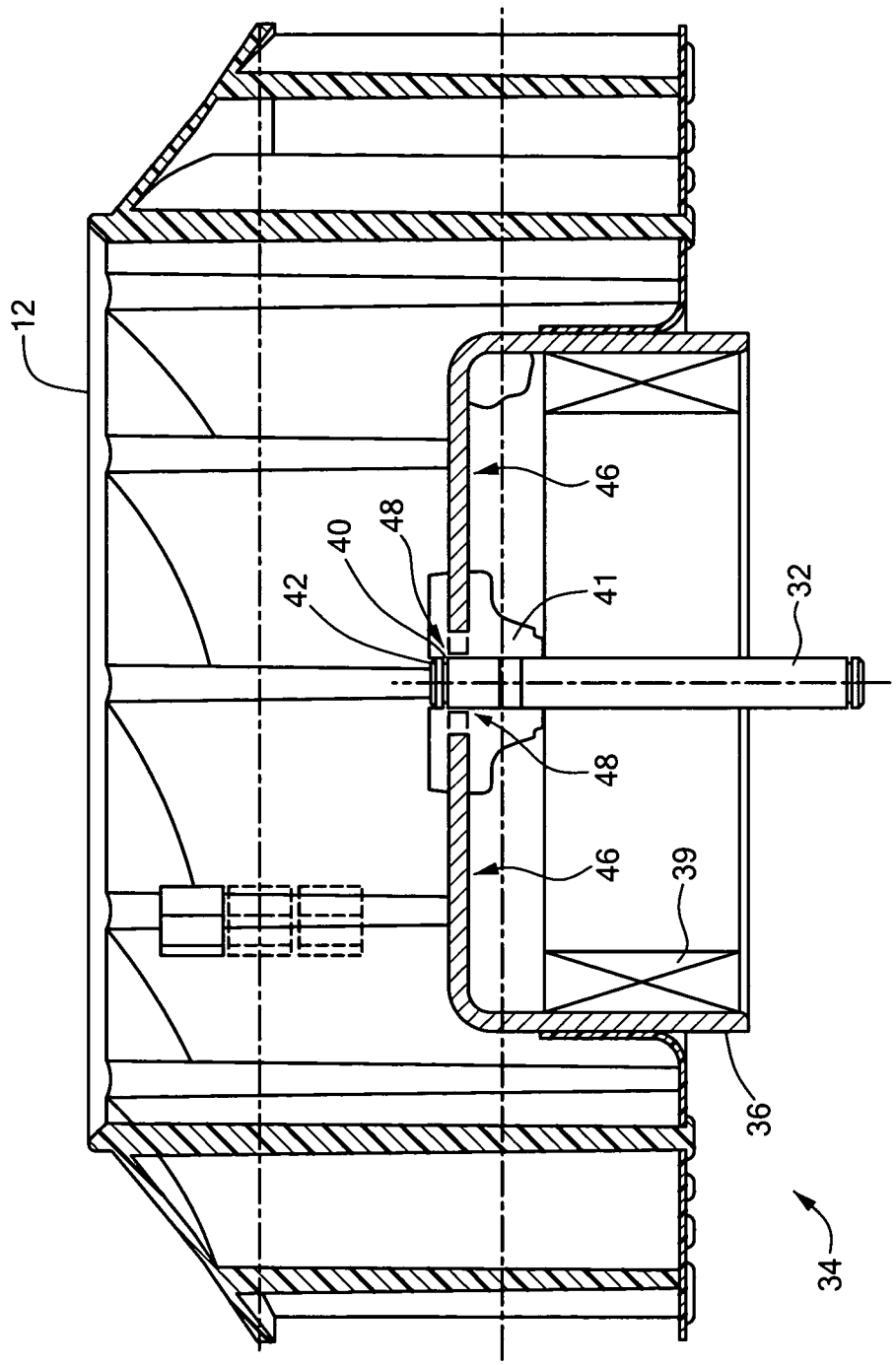
FIG. 3A schematically shows a cross-sectional view of the rotor shown in FIG. 2 across line 3-3.
Figure 3B:
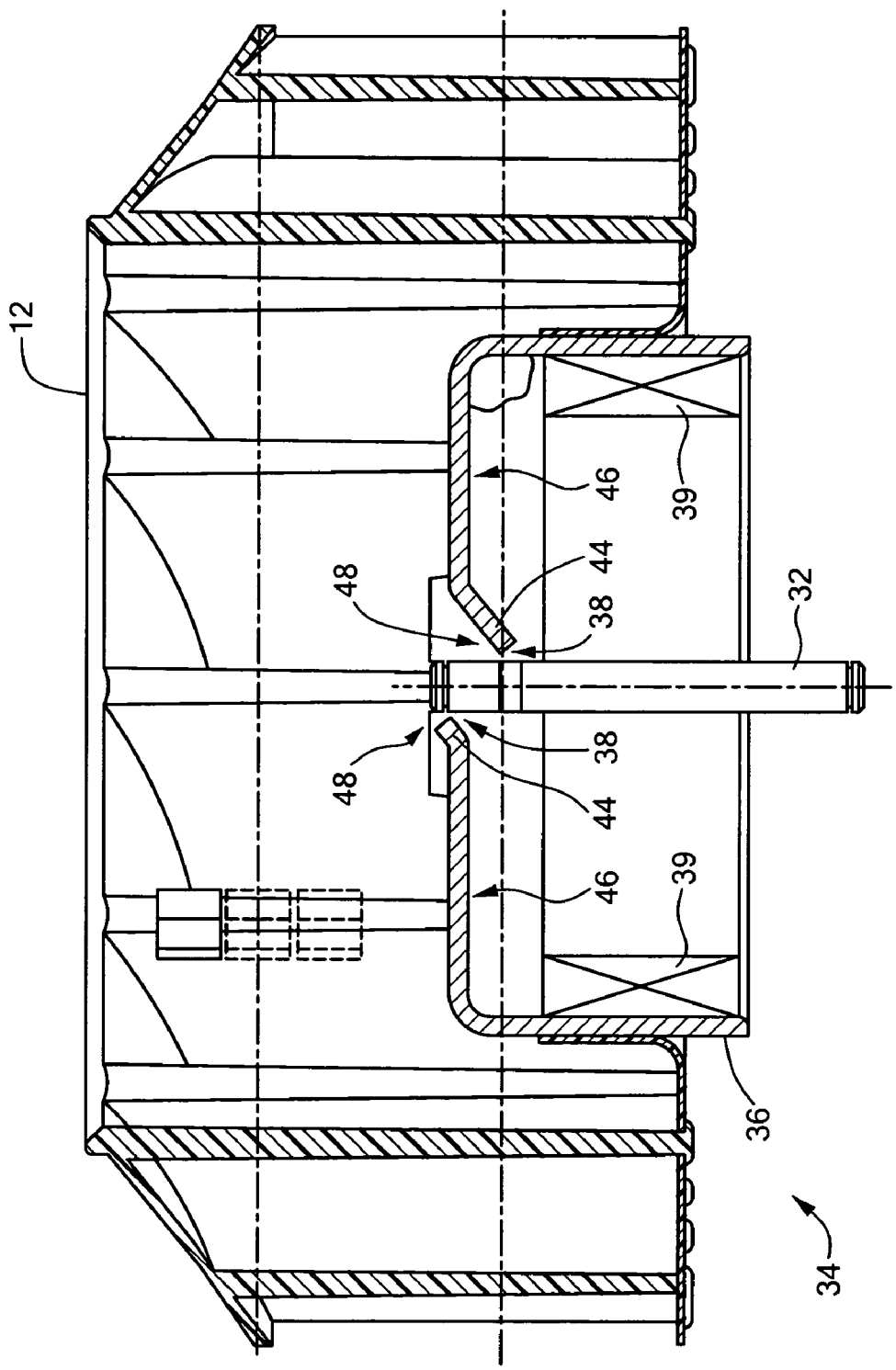
FIG. 3B schematically shows a cross-sectional view of the rotor shown in FIG. 2 across line 3-3, but without the fill material.

FIG. 3A schematically shows a cross sectional view of the rotor assembly 34 shown in FIG. 2 across line 3-3. FIG. 3B schematically shows the same view, but without fill material 41 (discussed below). Specifically, as shown in these figures, the shaft 32 preferably is substantially perpendicularly mounted to the cup 36 and propeller 12. Stated another way, the shaft axis is coaxially aligned with the central axis of the cup 36 and propeller 12. In illustrative embodiments, the shaft 32 is mounted to the center of gravity of the overall rotor assembly 34.

In accordance with illustrative embodiments, the shaft 32 is secured to the cup 36 by means of a fill material 41 (e.g., zinc, shown in FIG. 3A) that is reinforced by the noted cup tabs 44 (shown in FIG. 3B). To that end, the cup 36 includes a peripheral portion 46 that terminates at an interior rim 48. The rim 48 has a plurality of diverging tabs 44 that together effectively form a center opening/hole 38 (hereinafter "hole 38") for receiving the shaft 32. In illustrative embodiments, the center hole 38 has an inner diameter/dimension that is greater than the outer diameter of the shaft 32.

In addition, the shaft 32 has a groove 40 that forms a securing flange 42 at the end of the shaft 32 nearest the cup 36. The securing flange 42 may act as an anchor to secure the shaft 32 to the fill material 41. In some embodiments, the shaft 32 also has a knurled outer surface, which at least partially is covered by the fill material 41. This surface further secures the shaft 32 with the remainder of the rotor assembly 34.

As shown in FIG. 3A, molding processes cure the fill material 41 to a solid object that secures the shaft 32 to the cup 36. Also as noted above and shown in FIG. 3B, the tabs 44 illustratively are formed to diverge from the remainder of the peripheral portion 46 of the cup 36. Specifically, FIG. 3B shows a first tab 44 formed to diverge upwardly (relative to the effective horizontal of the rotor 20) and a second tab 44 formed to diverge downwardly (relative to the noted horizontal). Their ends thus are longitudinally spaced from each other (and from the peripheral portion 46 of the cup 36) in a direction that is substantially parallel to the shaft 32. Additional tabs 44 also may be included. Consequently, because they extend in different directions along the shaft 32, the tabs 44 effectively provide counteracting lever arms to further support the shaft 32 and its connection with the cup 36. The tabs 44 illustratively also extend vertically to different sides of the center of gravity of the cup 36.

As noted above, although they do extend toward the shaft 32, the tabs 44 illustratively do not contact the shaft 32. Instead, the tabs 44 merely reinforce the fill material 41 securing the shaft 32 to the cup 36. It should be noted that the tabs 44 are considered to be diverging from the peripheral portion 46 because their ends are spaced along the shaft 32 as noted above. This divergence can be planar, as shown in the drawings, or with some other configuration. For example, the divergence may cause the tabs 44 to have an oscillating or curved shape with ends positioned as noted.

In alternative embodiments, rather than extending above and below the horizontal, the tabs 44 merely extend below the horizontal and/or at the horizontal. In yet other embodiments, the tabs 44 merely extend above and/or at the horizontal.

Figure 3C:
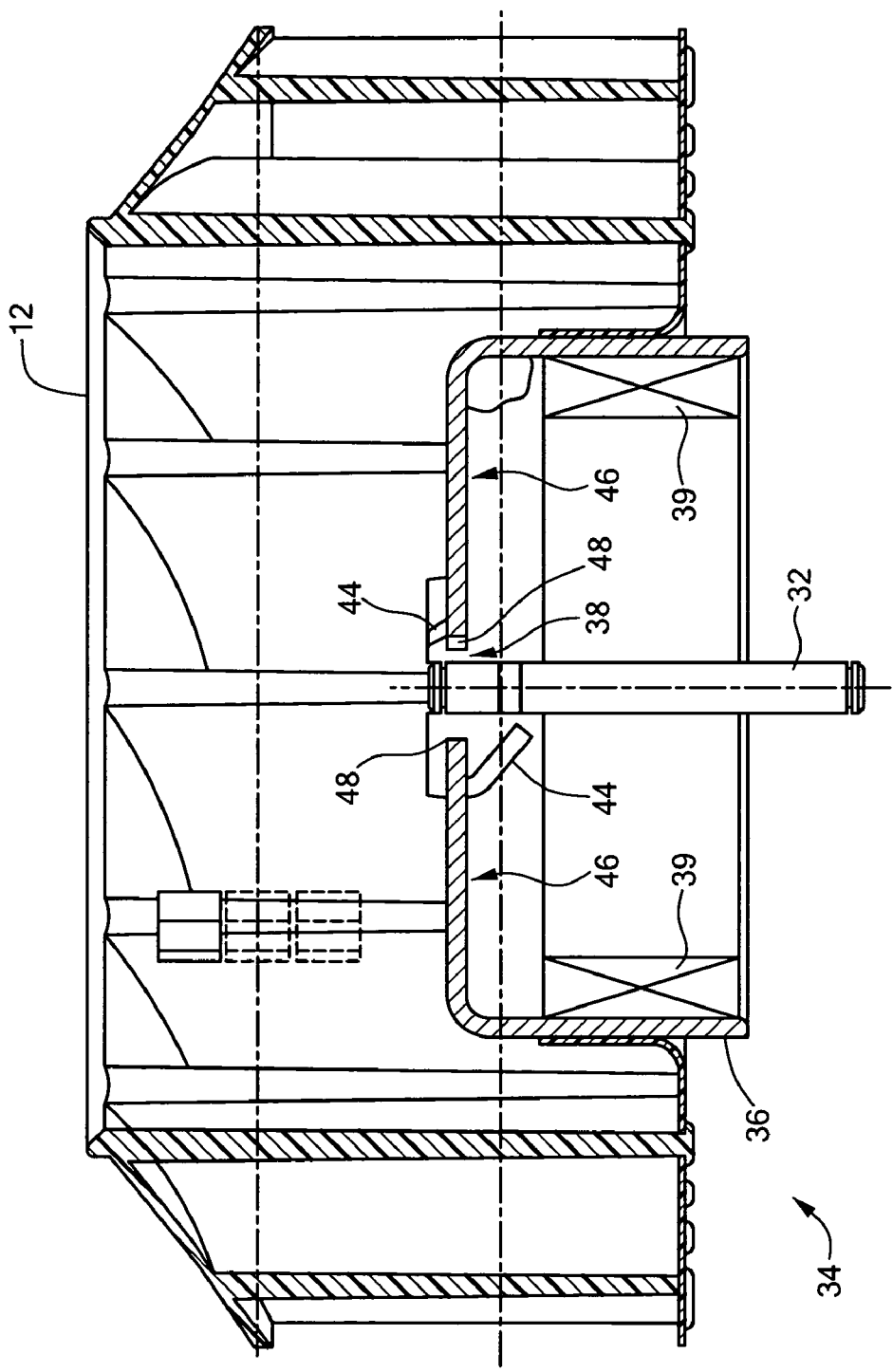
FIG. 3C schematically shows a cross-sectional view of the rotor shown in FIG. 2 across line 3-3, but without the fill material.

Some embodiments of the invention do not integrate all of the tabs 44 into the rim 48. Instead, as shown in FIG. 3C, some embodiments integrate at least one of the tabs 44 into a portion (of the peripheral portion 46) that is spaced from the rim 48. Accordingly, the rim 48 may have no diverging portion while the peripheral portion 46 has a plurality of diverging tabs 44 extending in different directions along the shaft 32. For example, the peripheral portion 46 may have a first pair of oppositely opposed tabs 44 extending from its top surface, and a second pair of oppositely opposed tabs 44 extending from its bottom surface. Among other ways, the first pair of tabs 44 may be radially positioned ninety degrees from the second pair. In a manner similar to those embodiments noted above, the tabs 44 in each pair may be spaced from the tabs 44 in the other pair in a direction that is substantially parallel with the shaft 32.

Of course, discussion of a specific number of tabs 44 and type of tabs 44 is exemplary and not intended to limit the scope of the invention. Accordingly, such discussion does not necessarily apply to all embodiments of the invention.

Rather than use the noted fill material 41, some embodiments simply mold the propeller 12 directly onto the shaft 32. In such case, the material that makes up the propeller 12 acts as the fill material 41. Accordingly, such embodiments do not require the extra step of using the fill material 41.

Figure 4:
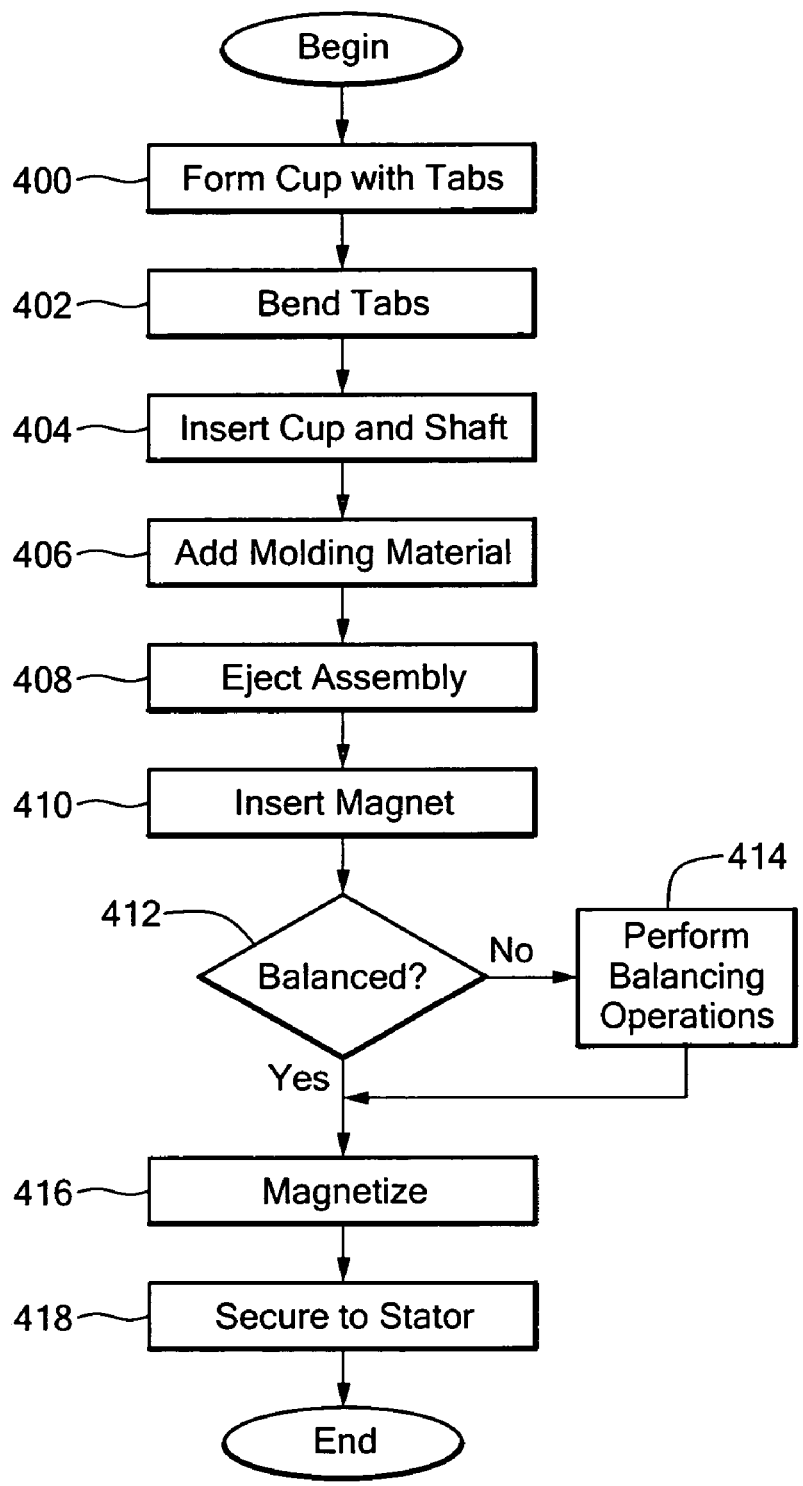
FIG. 4 shows a process of producing a rotor in accordance with illustrative embodiments of the invention.

FIG. 4 shows a process of producing a rotor assembly 34 in accordance with illustrative embodiments of the invention. This process incorporates the embodiment in which the propeller 12 secures the shaft 32 and cup 36 and thus, effectively acts as the fill material 41.

The process begins at step 400, in which conventional processes form the cup 36 with tabs 44 as shown by FIG. 3B or 3C. In illustrative embodiments, the tabs 44 are formed to be substantially co-planar with the horizontal of the peripheral portion 46. To that end, the cup 36 may be produced by conventional processes and cut at specified portions of its rim 48 to form the tabs 44.

After the tabs 44 are formed, the process continues to step 402, in which the tabs 44 are bent to the noted diverging pre-specified positions, such as those shown in FIGS. 3B and 3C. In alternative embodiments, the cup 36 may be pre-formed to diverge and thus, enable the process to omit step 402.

The cup 36 and shaft 32 then are inserted into and positioned within a molding chamber of an insert molding machine (step 404). The insert molding machine may be similar to that disclosed in co-pending U.S. patent application Ser. No. 10/116,329, the disclosure of which is incorporated herein, in its entirety, by reference. When inserted into the molding machine, the shaft 32 is fixedly positioned so that it passes through the center hole 38 of the cup 36. Moreover, the shaft 32 is positioned so that its outer diameter does not contact the inner diameter of the center hole 38, and so that it is substantially perpendicular to the inner surface of the cup 36. Stated another way (as noted above), shaft 32 is fixedly positioned so that its longitudinal axis is substantially coincident with the center axis of the cup 36. The close tolerances of the mold should ensure that this is the case.

Molding material then is injected into the molding chamber (step 406). To that end, valve gates of the molding machine are controlled, by conventional processes, to permit a predetermined volume of molding material into the molding. The molding material may be any resin or other material that commonly is used in molding processes. The molding material then fills the mold chamber as desired in the shape of a propeller 12 and over at least a portion of the tabs 44 and the shaft 32 (see, for example, FIG. 3A).

After the material has cured, then a solid propeller 12 has been formed and has been fixedly secured to the cup 36 and shaft 32, thus producing the rotor assembly 34. The process then continues to step 408, in which the rotor assembly 34 is ejected from the molding chamber. The annular permanent magnet 39 then is secured to the inner annular surface of the cup 36 to complete production of the primary structure of the rotor assembly 34 (step 410). It should be noted that at this point, illustrative embodiments of the magnet 39 are not magnetized.

It then is determined at step 412 if the rotor assembly 34 is balanced. In illustrative embodiments, the rotor assembly 34 should not be out of balance due to the shaft 32 and cup 36 alignment since such elements were fixedly secured in their perpendicular relationship. For example, the rotor assembly 34 may be out of balance due to the annular permanent magnet 39 placement within the cup 36.

Many motor manufacturers nevertheless are required to perform a quality control function that checks each rotor assembly 34 for proper balance, even if such rotor assembly 34 was produced by a process with a low probability of producing imbalanced rotors 20. If the rotor assembly 34 is not balanced, then the process continues to step 414 to perform conventional balancing operations. For example, small pieces of material may be connected to the rotor assembly 34 at selected locations to offset a weight disparity at a corresponding part of the rotor assembly 34. In illustrative embodiments, balancing material is injected into the void 68 formed by the molding process.

The process then continues to step 416, in which the magnet 39 is magnetized in accordance with conventional processes. The rotor assembly 34 then is ready to be coupled with the stator 18 (step 418), thus completing the basic production of the motor 10.

As noted above and as shown in FIG. 3A, the cured fill material 41 may be secured/formed from a separate material and/or at a different time than when the propeller 12 is formed/attached. For example, the process shown in FIG. 5 may be modified by substituting steps 404 and 406 for a plurality of steps that may include:

insert cup, shaft 32, and pre-molded propeller 12 into the molding machine,
inject fill material 41 (e.g., zinc) into central hole 38 through a hole in propeller 12,
allow fill material 41 to cure.

Accordingly, the fill material 41 secures the propeller 12, cup 36 and shaft 32 together. Moreover, the fill material 41 also may fill a part of the propeller 12 (through the hole that permits the fill material 41 to be added).

Although the above discussion discloses various exemplary embodiments of the invention, it should be apparent that those skilled in the art can make various modifications that will achieve some of the advantages of the invention without departing from the true scope of the invention.

What is claimed is:

1. A rotor comprising:
a support member having a peripheral portion and an interior rim, the interior rim having a plurality of protruding members that define a central opening and diverge from the peripheral portion, wherein at least one of the protruding members diverges downwardly from the peripheral portion relative to a horizontal and at least one of the protruding members diverges upwardly from the peripheral portion relative to a horizontal so that ends of the protruding members are spaced from each other in a direction that is substantially parallel to the shaft, and wherein the plurality of protruding members that define the central opening and diverge from the peripheral portion terminate at the interior rim:
a shaft coupled within the central opening of the support member; molded material fixedly coupling the shaft to the support member; an impeller or propeller coupled to the support member; and an annular magnet circumscribing an interior of the support member.

2. The rotor as defined by claim 1 wherein the shaft is substantially coaxial with the support member.

3. The rotor as defined by claim 1 wherein the molded material fills the central opening and is formed over at least a portion of the interior rim.

4. The rotor as defined by claim 3, wherein the molded material filling the central opening is reinforced by the protruding members.

5. The rotor as defined by claim 1 wherein the interior rim diverges in a substantially planar manner from the peripheral portion.

6. The rotor as defined by claim 1 wherein the shaft has an outer diameter, the central opening being larger than the outer diameter of the shaft.

7. The rotor as defined by claim 1 wherein the support member has a substantial center of gravity, the shaft being secured to the support member at its substantial center of gravity.

8. The rotor as defined by claim 1 wherein the interior rim includes a first portion and a second portion, the first portion being spaced from the second portion along a direction that is substantially parallel to the shaft.

9. The rotor as defined by claim 1 wherein the support member is cup-shaped.

10. A rotor comprising:
   a shaft;
   a support member having a peripheral portion and an interior rim, the interior rim defining a central opening that receives and fixedly coupled to the shaft, wherein the shaft is substantially coaxial with the support member;
   the shaft has a groove that forms a securing flange at the end of the shaft nearest the support member;
   the interior rim having first and second portions, the first portion of the interior rim being less than 360 degrees around the shaft, the first portion of the interior rim being spaced in a first direction from the peripheral portion, the second portion of the interior rim being spaced in a second direction from the peripheral portion,
   the first and second directions being substantially parallel to the shaft,
   the first and second directions being different directions so that ends of the first portion and ends of the second portion are spaced from each other in a direction that is substantially parallel to the shaft;
   an impeller or propeller coupled to the support member;
   a fill material that secures the impeller or propeller to the securing flange of the shaft and the first and second portions; and
   an annular magnet circumscribing an interior of the support member.

11. The rotor as defined by claim 10 wherein the interior rim is integral with the peripheral portion.

12. The rotor as defined by claim 10 wherein the first and second portions of the rim diverge from the peripheral portion.

13. The rotor as defined by claim 10 further including material fixedly coupling the shaft with the support member, the material filling the central opening and being formed over at least a portion of the interior rim.

14. The rotor as defined by claim 10 wherein the interior rim diverges in a substantially planar manner from the peripheral portion.

15. The rotor as defined by claim 10 wherein the shaft has an outer diameter, the central opening being larger than the outer diameter of the shaft.

16. The rotor as defined by claim 10 wherein the support member has a substantial center of gravity, the shaft being secured at the substantial center of gravity of the support member.

17. A motor comprising:
   a stator;
   the stator having a circuit board, an arbor, and a plurality of coils, wherein the circuit board includes a magnetic sensor so that the flow of current to the plurality of coils can be controlled;
   a shaft, wherein the shaft has a groove that forms a securing flange at the end of the shaft nearest the support member; and
   a rotor having a support member, an impeller or propeller coupled to the support member and an annular magnet circumscribing an interior of the support member, the support member having a peripheral portion and an interior rim, the interior rim defining a central opening, the interior rim also diverging from the peripheral portion, the interior rim having a first portion and a second portion, the first portion diverging downwardly and the second portion diverging upwardly from the peripheral portion relative to a horizontal so that ends of the first portion are spaced from ends of the second portion in a direction substantially parallel with the shaft;
   the shaft being fixedly coupled to the support member within the central opening of the support member, the first portion of the interior rim being less than 360 degrees around the shaft,
   the shaft also being rotatably coupled with the stator.

18. The motor as defined by claim 17 further including rotor commutation circuitry to control rotation of the rotor.

19. The motor as defined by claim 17 wherein the interior rim defines a plurality of protruding members, the protruding members diverging from the peripheral portion and spaced from each other in a direction substantially parallel with the shaft.

20. The motor as defined by claim 17 wherein the shaft is substantially coaxial with the support member.

21. The motor as defined by claim 17 further including material fixedly coupling the shaft with the support member, the material filling the central opening and being formed over at least a portion of the interior rim.

22. The motor as defined by claim 17 wherein the support member has a substantial center of gravity, the shaft being secured at the substantial center of gravity of the support member.

23. The motor of claim 17, wherein the impeller or propeller is molded directly onto the shaft without using fill material.

24. The motor of claim 17, wherein a fill material secures the impeller or propeller to the shaft and the diverging members, and the fill material filling the central opening and being formed over at least a portion of the interior rim.

25. A fan assembly comprising:
   a housing;
   a motor having a stator;
   the stator having a circuit board and an arbor, wherein the circuit board includes a magnetic sensor so that the flow of current to the plurality of coils can be controlled;
   a rotor having a support member having a peripheral portion and an interior rim, the interior rim defining a central opening;
   a plurality of diverging members extending from the support member, wherein the plurality of diverging members extend from the peripheral portion;
   a shaft fixedly coupled to the support member within the central opening of the support member, the diverging members extending toward the shaft, each diverging member extending less than 360 degrees around the shaft, at least one of the diverging members diverging downwardly and at least one of the diverging members diverging upwardly from the peripheral portion relative to a horizontal so that ends of the diverging members are spaced from each other in a direction that is substantially parallel to the shaft, and wherein the plurality diverging members that define the central opening and diverge from the peripheral portion terminate at the interior rim;

wherein the shaft has a groove that forms a securing flange at the end of the shaft nearest the support member;

a bearing above the stator and a bearing below the stator, wherein the bearings are secured within the arbor to receive the rotor shaft;

an impeller or propeller coupled to the support member;

an annular magnet circumscribing an interior of the support member;

a fill material that secures the impeller or propeller to the shaft and the plurality of diverging members, wherein the fill material fills the central opening and is formed over at least a portion of the diverging member;

wherein the securing flange acts as an anchor to secure the shaft to the fill material; and wherein the rotor and motor are located in the housing.

26. The fan assembly as defined by claim 25 wherein each of the plurality of diverging members diverge from the peripheral portion.

27. The fan assembly as defined by claim 25 wherein the plurality of diverging members are coupled radially inwardly from the interior rim.

* * * * *